(12) United States Patent
Boland et al.

(10) Patent No.: US 9,593,674 B2
(45) Date of Patent: Mar. 14, 2017

(54) PLANETARY GEAR

(71) Applicant: Siemens Aktiengesellschaft, München (DE)

(72) Inventors: Klaus Boland, Hamminkeln (DE); Dominikus Daners, Herten (DE); Markus Degeling, Rhede (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/867,903

(22) Filed: Sep. 28, 2015

(65) Prior Publication Data

US 2016/0091082 A1 Mar. 31, 2016

(30) Foreign Application Priority Data

Sep. 29, 2014 (EP) .................................... 14186837

(51) Int. Cl.
*F16H 57/04* (2010.01)
*F03D 11/02* (2006.01)
(Continued)

(52) U.S. Cl.
CPC ............... *F03D 11/02* (2013.01); *F03D 1/06* (2013.01); *F03D 9/002* (2013.01);
(Continued)

(58) Field of Classification Search
CPC .. F03D 9/002; F16H 57/0479; F16H 57/0486; F16H 2057/02078; F16H 57/043
(Continued)

(56) References Cited

U.S. PATENT DOCUMENTS 8,025,601 B2 * 9/2011 Iwasaki .................... F16H 3/66
475/159
8,529,391 B2 9/2013 Degeling
(Continued)

FOREIGN PATENT DOCUMENTS

CA 2825004 A1 * 7/2012 ............. B63H 21/38
CN 201277153 Y * 7/2009 ............... F16H 1/28
(Continued)

OTHER PUBLICATIONS

English translation of CN201277153; https://translationportal.epo.org; Aug. 18, 2016.*
(Continued)

*Primary Examiner* — Roger Pang
(74) *Attorney, Agent, or Firm* — Henry M. Feiereisen LLC.

(57) ABSTRACT

A planetary gear includes a central sun gear having external teeth, a ring gear having internal teeth, a planetary carrier having formed therein lubricant supply channels, and planet gears supported on the planetary carrier and having side cheeks engaging the internal teeth of the ring gear and the external teeth of the sun gear. A slide bush radially supports the planetary carrier and has radial outer and inner sliding surfaces, and an interposed shoulder surface, which bear flat upon a radial outer and inner bearing surfaces, and an interposed shoulder surface on an inner surface of the planetary carrier. An annular lubricant distribution channel is formed between the shoulder surfaces of the slide bush and the planetary carrier, with the lubricant supply channels feeding into the lubricant distribution channel on the inlet side and connected to the external lubricant supply via a lubricant supply channel formed in the slide bush.

11 Claims, 2 Drawing Sheets

(51) Int. Cl.
 F03D 9/00 (2016.01)
 F03D 1/06 (2006.01)
 F16H 57/02 (2012.01)
(52) U.S. Cl.
 CPC ..... *F16H 57/0479* (2013.01); *F16H 57/0486* (2013.01); *F16H 57/043* (2013.01); *F16H 2057/02078* (2013.01)
(58) Field of Classification Search
 USPC ........................................................ 475/159
 See application file for complete search history.

(56) References Cited

U.S. PATENT DOCUMENTS

| | | | |
|---|---|---|---|
| 9,115,800 B2 | 8/2015 | Boland et al. | |
| 2009/0179387 A1* | 7/2009 | Saenz De Ugarte | .. F16J 15/441 |
| | | | 277/563 |
| 2012/0108380 A1* | 5/2012 | Dinter | ..................... F16C 17/10 |
| | | | 475/159 |
| 2013/0172144 A1* | 7/2013 | Suzuki | ................ F16H 57/0479 |
| | | | 475/159 |

FOREIGN PATENT DOCUMENTS

| | | | | |
|---|---|---|---|---|
| EP | 1431575 A2 | 6/2004 | | |
| EP | 2594789 A1 | 5/2013 | | |
| WO | WO 2006053940 A1 | 5/2006 | | |
| WO | WO 2012029129 A1 * | 3/2012 | ......... | F16H 57/0479 |

OTHER PUBLICATIONS

English translation of EP1431575; https://translationportal.epo.org; Aug. 18, 2016.*

* cited by examiner

PLANETARY GEAR

CROSS-REFERENCES TO RELATED APPLICATIONS

This application claims the priority of European Patent Application, Serial No. 14186837.2, filed Sep. 29, 2014, pursuant to 35 U.S.C. 119(a)-(d), the disclosure of which is incorporated herein by reference in its entirety as if fully set forth herein.

BACKGROUND OF THE INVENTION

The present invention relates to a planetary gear, in particular for a wind power plant.

The following discussion of related art is provided to assist the reader in understanding the advantages of the invention, and is not to be construed as an admission that this related art is prior art to this invention.

Modern wind power plants barely differ from one another externally. The differences lie substantially in the design of the gears which are provided between the rotor and the generator in order to convert the low rotational speed of the rotor hub into a higher rotational speed for the generator. For large plants, gear ratios of 1:100 are common. In order to produce such high gear ratios generally multi-stage gears are used. A combination of planetary gear stages and spur gear stages are typically used in common drive designs, wherein an obliquely toothed planetary gear is frequently used in the first high-torque gear stages, for a compact construction, whilst an obliquely toothed spur gear is used in the adjacent high performance stage.

The rotor shaft and/or rotor hub is connected to the planetary carrier of the first stage. The planetary carrier is mounted in two positions on axially opposing sides of the planet gears—i.e. on the drive side and on the output side of the gear stage—in the gear housing and drives the planet gears. Alternatively, mounting on one side is also possible. The ring gear is fixedly connected to the gear housing, resulting in a circulating motion of the planet gears in the gear mechanism. The torque is transmitted from the planet gears to the sun gear which is connected via an external spline to the planetary carrier of the second stage. The operation of the second planetary stage is identical to that of the first stage. In the last gear stage a further speed change is carried out by the spur gear driven by the sun gear of the second stage, so that a speed change is carried out from an initially low rotational speed of the rotor shaft at high torque to a high rotational speed of the generator shaft at low torque.

In conventional planetary gears and planetary-spur gears for wind power plants, rolling bearings are primarily used in order to mount the planet gears in the planet gear carrier and the planet gear carrier in the gear housing.

Hydrodynamically operated plain bearings are also occasionally used. Known plain bearing materials which are used here are, for example, white metals with alloy components and bronze alloys. Generally, plain bearings in industrial applications are designed with a lubrication gap of approximately 15 to 20 μm relative to the diameter in the operating point. At least 5 Mpa is set by the bearing manufacturer as the permissible mean dynamic pressure for white metal.

The use of plain bearings, however, is relatively rare. The reasons for this are the transient operating conditions which frequently prevail and the extremely low sliding speeds which temporarily occur, with the plain bearings being subjected to extreme stress at the same time. Conventional plain bearings are primarily used in conditions where high to very high rotational speeds are present. As a result, usually rolling bearings are almost exclusively used for bearing points in wind turbine gear mechanisms.

Irrespective of whether rolling bearings or plain bearings are used, attempts have been made to avoid operation in mixed friction conditions by lubrication measures and thus to keep the wear at the bearing points as low as possible. The measures which have to be taken for the lubrication and cooling of the gear components, in particular in the region of the bearing points, however, are cost-intensive.

In order to supply the planet gear bearings with lubricant, lubricant channels are formed in the planetary carrier axles, lubricant being supplied thereto via a lubricant supply channel formed in the planetary carrier. The lubricant supply channel is connected in turn via a slide bush to a lubricant channel which, in particular, axially penetrates the wall of the gear housing. The slide bush is formed in an annular groove which is formed in the front face of the planetary carrier on the output side. The slide bush has a central connecting channel which connects the lubricant supply channel in the planetary carrier to the lubricant channel in the housing wall. To this end, the slide bush is held fixedly in terms of rotation on the housing and the planetary carrier is rotatable relative to the slide bush. To this end, the radial wall surfaces of the annular groove and the radial wall surfaces of the slide bush in contact therewith are configured with corresponding tolerances. In other words, the outer diameter of the slide bush and the inner diameter of the annular groove are adjusted so as to form an exact fit with each other and in the same manner the outer diameter of the annular groove and the inner diameter of the slide bush form an accurate fit. The realization of two accurately adjusted dimensions both on the inner face and on the outer face of the slide bush and on the inner face and on the outer face of the planetary carrier is difficult to implement.

It would therefore be desirable and advantageous to provide an improved planetary gear to obviate prior art shortcomings and to simplify a supply of lubricant to the planet gear bearings.

SUMMARY OF THE INVENTION

According to one aspect of the present invention, a planetary gear includes a gear housing, a central sun gear held in the gear housing for rotation about a central gear axis and having external teeth, a ring gear arranged in concentric relation to the central gear axis in the gear housing and having internal teeth, a planetary carrier mounted in the gear housing for rotation about the central gear axis and having formed therein lubricant supply channels, planet gear bearings, planetary carrier axles having formed therein lubricant channels to supply lubricant to the planet gear bearings, the lubricant channels being connected to the lubricant supply channels in the planetary carrier and having an inlet side connected to an external lubricant supply, a plurality of planet gears supported by the planet gear bearings on the planetary carrier for rotation about the planetary carrier axles, the planet gears having side cheeks in engagement with the internal teeth of the ring gear and the external teeth of the sun gear, and a slide bush configured to radially support the planetary carrier relative to the gear housing and held fixedly in terms of rotation on the gear housing, the slide bush having an outer surface defining a radial outer sliding surface, a radial inner sliding surface, and an interposed shoulder surface which correspond to a radial outer bearing surface, a radial inner bearing surface, and an interposed shoulder surface on an inner surface of the planetary carrier, with the sliding surfaces of the slide bush and the bearing surfaces of the planetary carrier bearing flat against one another, the slide bush being positioned relative to the planetary carrier such that an annular lubricant distribution channel is formed between the shoulder surface of the slide bush and the shoulder surface of the planetary carrier, with the lubricant supply channels feeding into the lubricant distribution channel on the inlet side and connected to the external lubricant supply via a lubricant supply channel formed in the slide bush.

In accordance with the invention, an annular lubricant distribution channel is formed between the stepped outer surface of the slide bush and the stepped inner surface of the planetary carrier. For this purpose, two sliding surfaces arranged radially offset to one another are configured on the outer surface of the slide bush and two corresponding bearing surfaces radially offset to one another are configured on the inner face of the planetary carrier. The surfaces bear flat against one another and thus have tolerances. Realization of two sliding surfaces on the outer face of the slide bush and two bearing surfaces on the inner face of the planetary carrier is considerably simpler and more reliable than the production of an inner and outer adjusting surface on the slide bush and an annular groove of the planetary carrier as required in the art.

The lubricant distribution channel which is configured between the shoulder surfaces of the slide bush and the planetary carrier and on its radial outer face is defined by the planetary carrier and on its radial inner face by the slide bush, extends in an annular manner about the central gear axis and permits optimal lubricant delivery to the lubricant supply channels which are formed in the rotating planetary carrier. The shoulder surfaces between the sliding surfaces of the slide bush and/or between the bearing surfaces of the planetary carrier in this case preferably extend radially or at least substantially radially.

According to another advantageous feature of the present invention, the shoulder surface of the slide bush and the shoulder surface of the planetary carriers can extend radially or at least substantially radially.

According to another advantageous feature of the present invention, the lubricant supply channel can extend axially in the slide bush. As a result, the lubricant supply channel can be realized in a simple manner and feeds axially into the lubricant distribution channel.

According to another advantageous feature of the present invention, the lubricant channels in the planetary carrier axles can include each an annular lubricant collection groove extending along an outer circumference of the respective planetary carrier axle, with the respective one of the lubricant supply channels of the planetary carrier feeding into the lubricant collection groove. As a result, a reliable delivery of lubricant from the lubricant supply channels of the planetary carrier to the lubricant channels in the planetary carrier axles is permitted as, due to the annular design of the collection grooves, the lubricant supply channels are also connected permanently to the lubricant collection groove during the rotation of the planetary carrier.

The slide bush in the region of its sliding surfaces is made of suitable plain bearing materials. For example, copper-zinc alloys or copper-tin alloys may be used. In this case, copper-zinc alloys with a zinc component of between 6% and 40% or copper-tin alloys with a tin component of between 4% and 12% are advantageously used. Conceivable also are aluminum-tin alloys, with the alloys advantageously having a tin component of between 6% and 40%. The plain bearing material may be roll-bonded onto the carrier plate. It is also possible to provide the sliding surfaces of the sliding surfaces used with a PVD coating. Similarly, the slide bush may also be made entirely of a plain bearing material.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
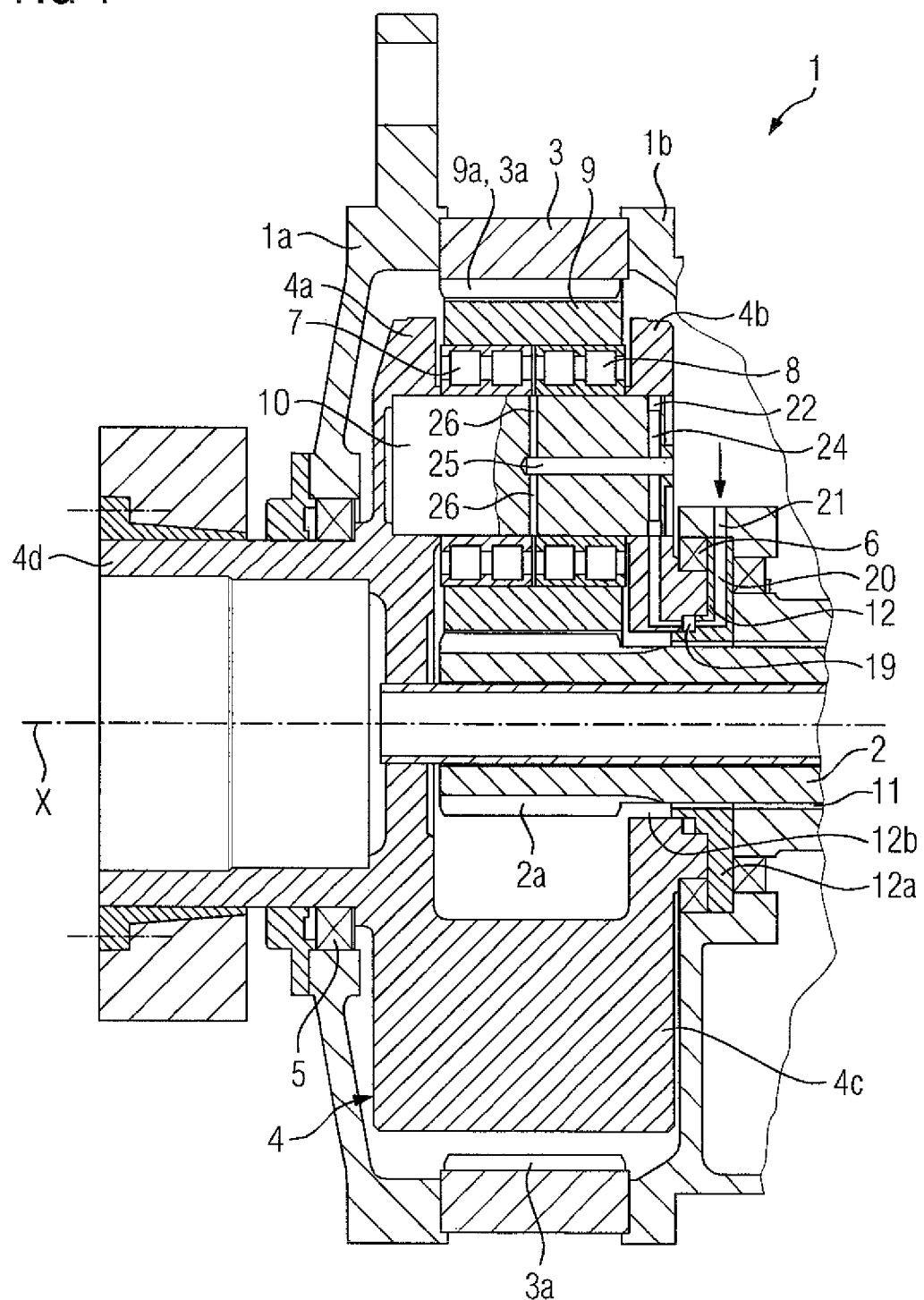
FIG. 1 is a schematic sectional view of an embodiment of a planetary gear according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic sectional view of a gear stage of a planetary gear according to the present invention. The planetary gear is arranged on the tower of a wind power plant, not shown, and provided to drive a generator via a rotor of the wind power plant, with the rotor carrying a plurality of blades, and at the same time provided to convert the slow rotational speed of the rotor shaft and/or rotor hub into a high rotational speed of the generator shaft. The planetary gear includes a gear housing 1 in which a planetary stage as a first gear stage is connected to further gear stages, not shown in the drawings, which may be configured as a spur gear stage or planetary stage. The first planetary stage shown of the planetary gear includes a central sun gear 2 which is held rotatably in the gear housing 1 about a central gear axis X and bears external teeth 2*a*. Moreover, a ring gear 3 forms part of the planetary gear. The ring gear 3 is fixedly arranged in the gear housing 1 concentrically to the central gear axis X and has internal teeth 3*a*.

Moreover, the planetary gear includes a planetary carrier 4. The planetary carrier is mounted and axially supported in the gear housing 1 for rotation about the gear axis X via rolling bearings 5, 6, and has two parallel side cheeks 4*a*, 4*b* which are connected together by webs 4*c*. A plurality of planet gears 9 form part of the planetary gear. The planet gears are rotatably mounted via planet gear bearings 7, 8 on the planetary carrier 4 and have external teeth 9*a* which are in engagement with the internal teeth 3*a* of the ring gear 3 and the external teeth 2*a* of the sun gear 2. In the exemplary embodiment, a total of three planet gears 9 are provided. The planet gears are arranged offset to one another by 120° and rotatably supported by the corresponding planet gear bearings 7, 8 on planetary carrier axles 10 extending parallel to the central gear axis X. The planetary carrier axles 10 extend between the side cheeks 4*a*, 4*b* of the planetary carrier 4. The planetary carrier 4 also has a connecting portion 4d formed as a hollow shaft via which the planetary carrier 4 is connected and/or is able to be connected to the rotor shaft of the rotor.

In the exemplary embodiment shown, the gear housing 1 has two housing parts 1a, 1b, with the ring gear 3 being positioned between the housing parts 1a, 1b and fixedly connected thereto. The housing part 1a is arranged on the drive side of the planetary gear facing the rotor and is configured in the form of a cover which is connected to the ring gear 3 and has a central through-opening for the hollow shaft of the planetary carrier 4.

The housing part 1b of the gear housing 1 is arranged on the outlet side of the planetary gear and forms a torque support. The torque support 1b is configured in the manner of a cover and defines a central through-opening 11 for the sun gear 2. The central through-opening 11 is provided in a slide bush 12 which is inserted into the torque support 1b from the output side of the planetary gear and fixedly connected to the torque support 1b. The slide bush 12 is of L-shaped configuration in cross section and has a radial limb 12a and an axial limb 12b. The radial limb 12a of the slide bush 12 opposes the side cheek 4b of the planetary carrier 4 on the output side and forms therewith a defined radial gap. This ensures that the slide bush 12 at this point is not able to undertake a bearing function for the planetary carrier 4.

Figure 2:
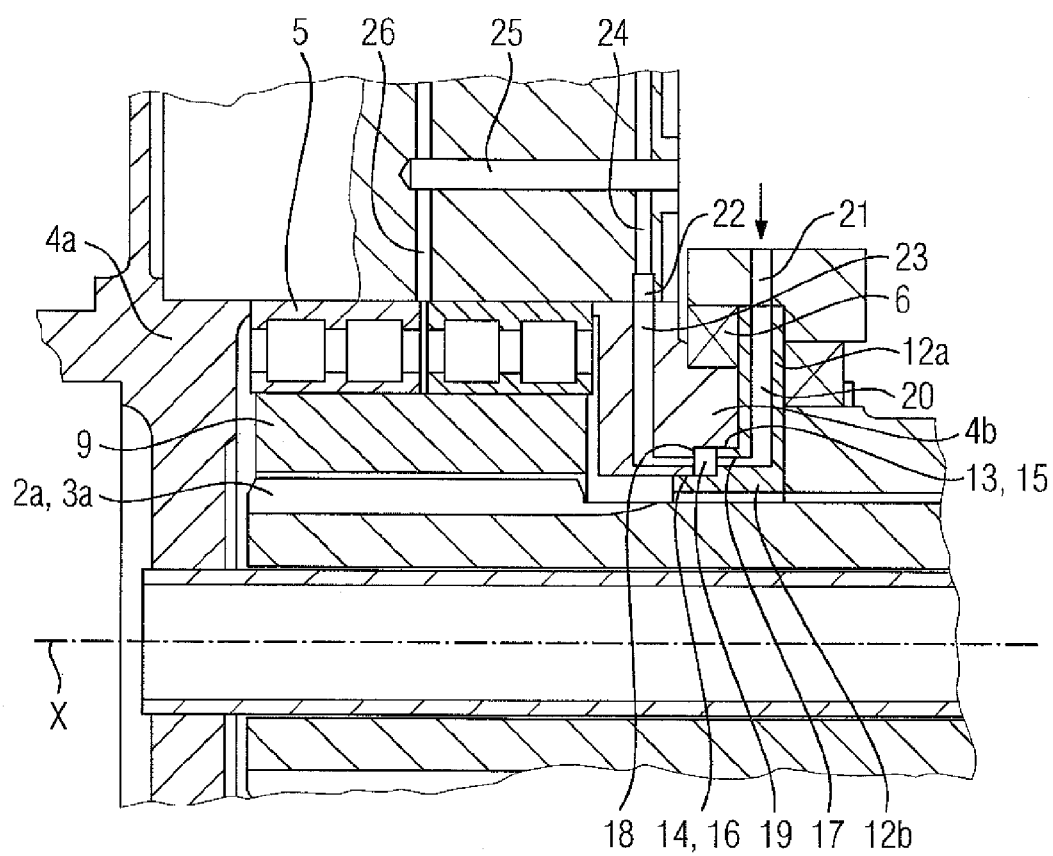
FIG. 2 is a detailed view, one an enlarged scale, of the planetary gear of FIG. 1.

In the radial direction, the planetary carrier 4 is supported on the axial portion 12b of the slide bush 12. The axial portion 12b of the slide bush 12 has an outer surface to form two sliding surfaces 13, 14 arranged radially offset to one another, and two corresponding radially offset bearing surfaces 15, 16 are formed on the inner face of the planetary carrier 4. The sliding surfaces 13, 14 and the bearing surfaces 15, 16 bear flat against one another and, depending on the type of fit, are configured with tolerances. The radial outer sliding surface 13 is configured on a region of the axial portion 12b of the slide bush 12 located in the vicinity of the radial portion 12a, whilst the radial inner sliding surface 14 is positioned in the vicinity of the free end of the axial portion 12b. Shoulder surfaces 17, 18 extending in the radial direction are hereby formed between the sliding surfaces 13, 14 of the slide bush 12 and the corresponding bearing surfaces 15, 16 on the inner face of the planetary carrier 4. As is readily apparent from FIG. 2, these shoulder surfaces 17, 18 oppose one another with an axial spacing so that an annular lubricant distribution channel 19 is formed between the shoulder surfaces 17, 18. The lubricant distribution channel is delimited on its outer face by the inner surface of the planetary carrier 4 and on its radial inner face by the outer surface of the axial portion 12b of the slide bush 12. The lubricant distribution channel 19 is connected to an external lubricant supply 21 via a lubricant supply channel 20 formed in the slide bush 12.

The lubricant distribution channel 19 and the lubricant supply channel 20 form part of a lubrication system which in operation serves to supply the planetary carrier axles 10 and the planet gear bearings 7, 8 continuously with a lubricant, in particular a lubricating oil, and thus to lubricate the planet gear bearings 7, 8 during operation and to cool the planet gear bearings 7, 8 and the planetary carrier axles 10. For this purpose, corresponding lubricant channels are formed in the planetary carrier axles 10. The lubricant channels have on the inlet side an annular lubricant collection groove 22 extending along the outer circumference of the respective planetary carrier axle 10. The lubricant collection groove is connected to the annular lubricant distribution channel 19 via a lubricant supply channel 23 formed in the planetary carrier 4. The lubricant collection groove 22 is in turn connected to a central lubricant channel 25 via a plurality of connecting channels 24 extending radially in the planetary carrier axle 10. The central lubricant channel extends in the axial direction centrally through the planetary carrier axle 10, and radial lubricant distribution channels 26 extend from the central lubricant channel 25 approximately at a central axial height of the planetary carrier axles 10. The radial lubricant distribution channels 26 extend to the outer face of the planetary carrier axles 10 and thus feed into the region between the two planet gear bearings 7, 8.

Although not shown in the drawings, an oil delivery pump is connected to the gear housing 1 via an externally located oil line. The oil delivery pump draws lubricating oil out of the oil sump located in the gear housing 1 and delivers it under pressure back into the gear housing 1 via the lubricant supply 21 after filtration and optional cooling.

During operation, a lubricant in the form of lubricating oil is supplied to the annular lubricant distribution channel 19 which is formed between the planetary carrier 4 and the slide bush 12, via the lubricant supply channel 20 formed in the slide bush 12. This lubricating oil is supplied to the lubricant collection grooves 22 of the planetary carrier axles 10 via the corresponding lubricant supply channels 23 in the planetary carrier 4. As a result of the annular design of the lubricant collection grooves 22 and the lubricant distribution channel 19, even during a rotation of the planetary carrier 4 the lubricant supply channels 23 of the planetary carrier 4 are continuously connected to the lubricant collection grooves 22 and the lubricant distribution channel 19, and therefore the planetary carrier axles 10 are continuously supplied with oil. The lubricating oil is supplied to the planet gear bearings 7, 8 from the lubricant collection grooves 22 via the radial connection channels 24, the central oil channel and the lubricant distribution channels in the planetary carrier axles 10.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:
1. A planetary gear, comprising:
a gear housing;
a central sun gear held in the gear housing for rotation about a central gear axis and having external teeth;
a ring gear arranged in concentric relation to the central gear axis in the gear housing and having internal teeth;
a planetary carrier mounted in the gear housing for rotation about the central gear axis and having formed therein lubricant supply channels;
planet gear bearings;
planetary carrier axles having formed therein lubricant channels to supply lubricant to the planet gear bearings, said lubricant channels being connected to the lubricant supply channels in the planetary carrier and having an inlet side connected to an external lubricant supply;

a plurality of planet gears supported by the planet gear bearings on the planetary carrier for rotation about the planetary carrier axles, said planet gears having external teeth in engagement with the internal teeth of the ring gear and the external teeth of the sun gear; and a slide bush configured to radially support the planetary carrier relative to the gear housing and held fixedly in terms of rotation on the gear housing, said slide bush having an outer surface defining a radial outer sliding surface, a radial inner sliding surface, and an interposed shoulder surface which correspond to a radial outer bearing surface, a radial inner bearing surface, and an interposed shoulder surface on an inner surface of the planetary carrier, with the sliding surfaces of the slide bush and the bearing surfaces of the planetary carrier bearing flat against one another, said slide bush being positioned relative to the planetary carrier such that an annular lubricant distribution channel is formed between the shoulder surface of the slide bush and the shoulder surface of the planetary carrier, with the lubricant supply channels feeding into the lubricant distribution channel on the inlet side and connected to the external lubricant supply via a lubricant supply channel formed in the slide bush.

2. The planetary gear of claim 1, constructed for a wind power plant.

3. The planetary gear of claim 1, wherein the shoulder surface of the slide bush and the shoulder surface of the planetary carrier extend radially or at least substantially radially.

4. The planetary gear of claim 1, wherein the lubricant supply channel extends axially in the slide bush.

5. The planetary gear of claim 1, wherein the lubricant channels in the planetary carrier axles comprise each an annular lubricant collection groove extending along an outer circumference of the respective planetary carrier axle, with the respective one of the lubricant supply channels of the planetary carrier feeding into the lubricant collection groove.

6. The planetary gear of claim 1, wherein the slide bush in a region of its sliding surfaces is made of plain bearing materials.

7. The planetary gear of claim 6, wherein the plain bearing materials include a copper-zinc alloy or a copper-tin alloy or an aluminum-tin alloy.

8. The planetary gear of claim 6, wherein the copper-zinc alloy has a zinc component between 6% and 40%.

9. The planetary gear of claim 6, wherein the copper-tin alloy has a tin component between 4% and 12%.

10. The planetary gear of claim 6, wherein the aluminum-tin alloy has a tin component of between 6% and 40%.

11. The planetary gear of claim 1, wherein the sliding surfaces have a PVD coating.

* * * * *